United States Patent [19]
Srinivasan et al.

[11] Patent Number: 5,438,836
[45] Date of Patent: Aug. 8, 1995

[54] DOWNFLOW PLATE AND FIN HEAT EXCHANGER FOR CRYOGENIC RECTIFICATION

[75] Inventors: Vijayaraghavan Srinivasan, Williamsville; Michael J. Lockett; John H. Ziemer, both of Grand Island, all of N.Y.

[73] Assignee: Praxair Technology, Inc., Danbury, Conn.

[21] Appl. No.: 286,233

[22] Filed: Aug. 5, 1994

[51] Int. Cl.[6] .......................... F25J 3/00; B01D 3/00; F28F 3/00
[52] U.S. Cl. ........................... 62/36; 62/50.2; 165/166; 202/158; 196/100
[58] Field of Search ................... 62/36, 50.2; 165/166; 202/158; 196/100

[56] References Cited

U.S. PATENT DOCUMENTS

| | | | |
|---|---|---|---|
| Re. 33,026 | 8/1989 | Petit et al. | 62/36 |
| 3,256,704 | 6/1966 | Becker | 62/42 |
| 3,568,462 | 3/1971 | Hoffman et al. | 62/42 |
| 4,599,097 | 7/1986 | Petit et al. | 62/36 |
| 4,606,745 | 8/1986 | Fujita | 62/42 |
| 5,014,773 | 5/1991 | Beduz et al. | 165/115 |
| 5,017,458 | 12/1991 | Grenier et al. | 62/42 |
| 5,122,174 | 6/1992 | Sunder et al. | 62/24 |
| 5,144,809 | 9/1992 | Chevalier et al. | 62/36 |
| 5,222,549 | 6/1993 | Ishii et al. | 165/166 X |
| 5,224,351 | 7/1993 | Jeannot et al. | 62/36 |
| 5,321,954 | 6/1994 | Lehman et al. | 165/166 X |
| 5,333,683 | 8/1994 | Arriulou et al. | 62/50.2 X |

FOREIGN PATENT DOCUMENTS

| | | |
|---|---|---|
| 28509 | 11/1972 | Australia . |
| 469780 | 2/1992 | European Pat. Off. . |
| 566435 | 10/1993 | European Pat. Off. . |

*Primary Examiner*—Christopher Kilner
*Attorney, Agent, or Firm*—Stanley Ktorides

[57] ABSTRACT

A downflow heat exchanger, particularly applicable as the main condenser/reboiler of a double column cryogenic air separation plant, wherein liquid distribution for uniform flow is carried out above the vapor passages and the well distributed liquid is passed into the liquid passages, preferably angularly onto the bridge fins, and then down through the liquid passages cocurrently with vapor in adjacent vapor passages.

11 Claims, 6 Drawing Sheets

DOWNFLOW PLATE AND FIN HEAT EXCHANGER FOR CRYOGENIC RECTIFICATION

TECHNICAL FIELD

This invention relates to downflow heat exchangers and is particularly advantageous for use as the main reboiler of a double column cryogenic rectification system.

BACKGROUND ART

The main condenser or reboiler in a double column cryogenic air separation plant has heretofore generally been of the thermosyphon type. With this type of heat exchanger nitrogen vapor from the higher pressure column condenses, exchanging heat by indirect heat exchange with the lower pressure vaporizing liquid oxygen of the lower pressure column. The liquid oxygen is drawn up through the heat exchanger by the thermosyphon effect and the heat exchange is carried out by the countercurrent flow of the liquid oxygen against the downflowing gaseous nitrogen.

A problem with the conventional thermosyphon configuration is that because of the head of liquid oxygen required to drive the circulation, the oxygen pressure at the base of the heat exchanger is increased. The oxygen liquid is therefore subcooled as it enters the heat exchanger. As the liquid rises, its temperature increases by sensible heat transfer and the pressure falls until eventually the temperature reaches the saturation temperature and boiling occurs. The net consequence is that the thermal performance of thermosyphon reboilers is diminished and the pressure of the condensing nitrogen cannot be reduced below a limiting value.

Those skilled in the art have addressed this problem by employing a downflow heat exchanger wherein both the gaseous nitrogen and the liquid oxygen flow downwardly in cocurrent fashion during the heat exchange. The downflow configuration reduces the nitrogen pressure in the higher pressure column resulting in power savings.

It is important in the operation of a downflow heat exchanger to ensure that the boiling liquid oxygen does not boil to dryness. Boiling liquid oxygen to dryness reduces the heat exchange efficiency and can increase the hydrocarbon concentration in localized areas within the heat exchange passages so as to reach a flammable concentration in such pockets, raising the danger of ignition. Accordingly, in the practice of cryogenic air separation with downflow heat exchangers, it is important that the liquid oxygen be evenly distributed to each of the liquid oxygen passages and that the liquid oxygen be uniformly distributed along each passage. This uniform distribution is generally done in two stages above the boiling heat exchange passages, a first rough distribution stage spaced from and followed by a second fine distribution stage. The well distributed liquid then flows through the heat exchange passages. The first stage has generally employed either orifices, openings or sparger tubes and the second stage has generally employed hardway fins. A disadvantage is that relatively expensive components are used for the first stage and it would be preferable to use only lower cost hardway fins to completely distribute the liquid. Furthermore, conventional first stage distributions require rather precise tolerances for the orifices or openings used to effect the first stage distribution.

Accordingly, it is an object of this invention to provide a downflow heat exchanger and heat exchange method, which may be effectively employed in cryogenic air separation, and which can reduce the problems of conventional downflow heat exchangers such as uneven liquid distribution.

SUMMARY OF THE INVENTION

The above and other objects, which will become apparent to one skilled in the art upon a reading of this disclosure, are achieved by the present invention, one aspect of which is:

A method for vaporizing a liquid by indirect heat exchange with a vapor comprising:
(A) providing a heat exchanger having at least one first passage and at least one second passage in alternating sequence;
(B) passing liquid into said first passage(s) and down through said first passage(s) through a section comprising means for achieving a well distributed flow of liquid;
(C) passing said well distributed liquid from said first passage(s) into said second passage(s) at an angle within the range of from 30 to 60 degrees from horizontal onto bridge fins located within said second passage(s);
(D) passing vapor into said first passage(s) below the point where said well distributed liquid is passed from said first passage(s); and
(E) passing vapor and liquid cocurrently through said first and second passages respectively and vaporizing said liquid in said second passage(s) by indirect heat exchange with said vapor in said first passage(s) during said cocurrent flow.

Another aspect of this invention

A heat exchanger comprising:
(A) a heat exchanger body having at least one first passage and at least one second passage in alternating sequence, said first passage(s) having a section comprising distribution enhancement means for achieving a well distributed flow of liquid;
(B) means for passing liquid into said first passage(s) above said distribution enhancement means;
(C) liquid passing means below said distribution enhancement means for passing liquid from said first passage(s) into said second passage(s) at an angle within the range of from 30 to 60 degrees from horizontal onto bridge fins located within said second passage(s); and
(D) means for passing vapor into said first passage(s) below said liquid passing means.

A further aspect of this invention is:

A double column system comprising a first column, a second column and a main heat exchanger, said double column comprising:
(A) a heat exchanger body of the main heat exchanger having at least one first passage and at least one second passage in alternating sequence, said first passage(s) having a section comprising distribution enhancement means for achieving a well distributed flow of liquid;
(B) means for passing liquid from said second column into said first passage (s) above said distribution enhancement means;
(C) liquid passing means below said distribution enhancement means for passing liquid from said first passage(s) into said second passage(s) at an angle within the range of from 30 to 60 degrees from horizontal onto bridge fins located within said second passage(s); and (D) means for passing vapor from said first column into said first passage(s) below said liquid passing means.

Another aspect of the invention is:

A method for vaporizing a liquid by indirect heat exchange with a vapor comprising:

(A) providing a heat exchanger having at least one first passage and at least one second passage in alternating sequence;

(B) passing liquid into said first passage(s) and down through said first passage(s) through a section comprising a one stage distribution enhancement means for achieving a well distributed flow of liquid;

(C) passing said well distributed liquid from said first passage(s) into said second passage(s);

(D) passing vapor into said first passage(s) below the point where said well distributed liquid is passed from said first passage(s); and (E) passing vapor and liquid cocurrently through said first and second passages respectively and vaporizing said liquid in said second passage(s) by indirect heat exchange with said vapor in said first passage(s) during said cocurrent flow.

Another aspect of this invention is:

A heat exchanger comprising:

(A) a heat exchanger body having at least one first passage and at least one second passage in alternating sequence, said first passage(s) having a section comprising a one stage distribution enhancement means for achieving a well distributed flow of liquid;

(B) means for passing liquid into said first passage(s) above said one stage distribution enhancement means;

(C) liquid passing means below said one stage distribution enhancement means for passing liquid from said first passage(s) into said second passage(s); and (D) means for passing vapor into said first passage(s) below said liquid passing means.

As used herein the term "liquid oxygen" means a liquid having an oxygen concentration of at least 90 mole percent.

As used herein, the term "gaseous nitrogen" means a vapor having a nitrogen concentration of at least 90 mole percent.

As used herein, the term "column" means a distillation or fractionation column or zone, i.e., a contacting column or zone wherein liquid and vapor phases are countercurrently contacted to effect separation of a fluid mixture, as for example, by contacting of the vapor and liquid phases on a series of vertically spaced trays or plates mounted within the column and/or on packing elements. For a further discussion of distillation columns, see the Chemical Engineer's Handbook fifth edition, edited by R. H. Perry and C. H. Chilton, McGraw-Hill Book Company, New York, Section 13, *The Continuous Distillation Process*. The term, double column, is used to mean a higher pressure column having its upper end in heat exchange relation with the lower end of a lower pressure column. A further discussion of double columns appears in Ruheman "The Separation of Gases", Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is normally adiabatic but can be non-adiabatic and can include stagewise or continuous contact between the phases. Separation process arrangements that utilize the principles of rectification to separate mixtures are often interchangeably termed rectification columns, distillation columns or fractionation columns. Cryogenic rectification is a rectification process carried out at least in part at temperatures at or below 150 degrees Kelvin (K).

As used herein, the term "indirect heat exchange" means the bringing of two fluid streams into heat exchange relation without any physical contact or intermixing of the fluids with each other.

As used herein, the term "feed air" means a mixture comprising primarily nitrogen and oxygen such as air.

As used herein, the term "one stage distribution enhancement" means uniform distribution of liquid over the cross-section of a passage by a single section of distribution means, such as perforated hardway fins.

As used herein the term "hardway fin" means a structure wherein the fins or corrugations are oriented perpendicular to the fluid flow thereby providing maximum resistance to the fluid flow.

As used herein, the terms "top", "bottom", "above", "below", "upper" and "lower", when used in reference to the downflow heat exchanger of this invention, are meant to refer to the heat exchanger when it is oriented vertically.

DETAILED DESCRIPTION

The invention comprises a downflow heat exchanger and heat exchange method, particularly useful as the main heat exchanger of a double column system such as is commonly employed in the cryogenic rectification of air, wherein the even distribution of the liquid, e.g. liquid oxygen, prior to its being passed into the heat exchange passages of the heat exchanger occurs above vapor or condensing heat exchange passages and the uniformly distributed liquid is then preferably angularly passed into the liquid or vaporizing heat exchange passages onto bridge fins. In this way vapor generated by the vaporization of the liquid in the boiling heat exchange passages does not interfere with the even distribution of the liquid prior to its being passed into the boiling heat exchange passages, thereby reducing or eliminating a source of uneven liquid distribution which could result in inefficient heat exchange and perhaps even raise safety concerns.

Figure 1:
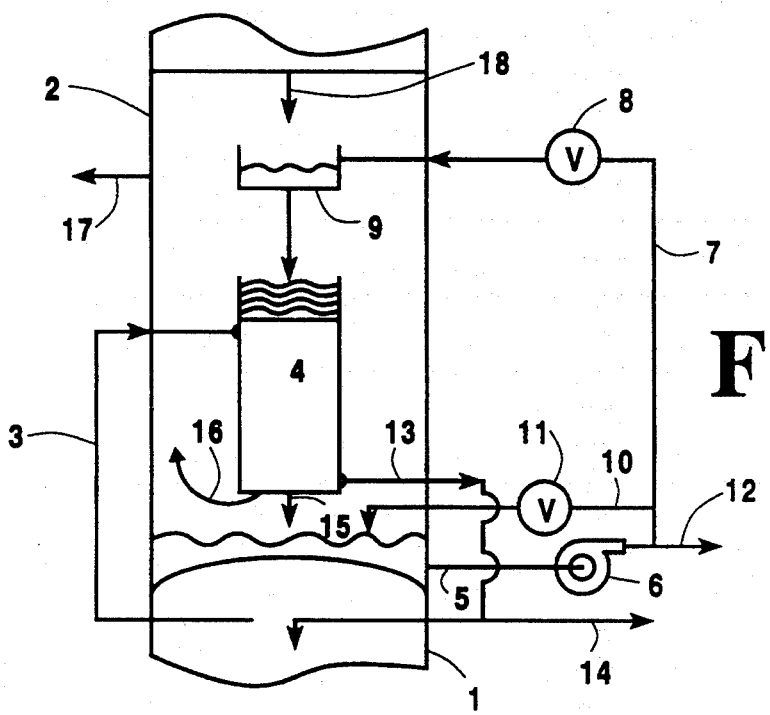
FIG. 1 is a simplified representation of a double column arrangement using the downflow heat exchanger of this invention.

The invention will be described in detail with reference to the drawings. Referring now to FIG. 1, there is shown the upper portion of a first column 1 and the lower portion of a second column 2 of a double column system wherein the first column is operating an a higher pressure than that of the second column. In a typical cryogenic air separation plant, feed air is passed into the higher pressure column 1 wherein it is separated by cryogenic rectification into nitrogen-enriched vapor and oxygen-enriched liquid which are passed into the lower pressure column 2 for separation by cryogenic rectification into nitrogen and oxygen product. In order to generate reflux for the columns, gaseous nitrogen from the higher pressure column is condensed against vaporizing liquid oxygen. Gaseous nitrogen is passed from column 1 through conduit 3 into vertically oriented main heat exchanger 4. Liquid oxygen is passed from column 2 in conduit 5 to liquid pump 6 and then through conduit 7 and valve 8 into liquid oxygen reservoir 9 and then into the upper portion of main heat exchanger 4 above the point where the gaseous nitrogen passes into main heat exchanger 4. A portion 10 of stream 7 may be returned to column 2 through valve 11 for flow control purposes. Another portion 12 of stream 7 may be recovered as product liquid oxygen.

The liquid oxygen and gaseous nitrogen flow cocurrently down main heat exchanger 4 and in the process the gaseous nitrogen is condensed against the vaporizing liquid oxygen. The resulting condensed nitrogen is passed out of main heat exchanger 4 through conduit 13 and passed into higher pressure column 1 as reflux. A portion 14 of the liquid nitrogen from the main heat exchanger is passed into lower pressure column 2 as reflux and a portion of stream 14 may be recovered as liquid nitrogen. Liquid oxygen which was not vaporized during the cocurrent flow through main heat exchanger 4 passes out of the main heat exchanger as shown by arrow 15. Gaseous oxygen which results from the aforesaid heat exchange within main heat exchanger 4 is passed out from the main heat exchanger into the second column such as is shown by arrow 16 and is passed up through column 2 as vapor upflow for the rectification. Some of this gaseous oxygen may be withdrawn from column 2 and recovered as product through conduit 17. As an alternative, the liquid oxygen reservoir 9 may be eliminated and liquid oxygen may be passed directly through conduit 7 and valve 8 into the upper portion of main heat exchanger 4. As further alternatives, liquid 18 leaving the contact means in the lower pressure column may be passed to liquid oxygen reservoir 9 as shown in FIG. 1 or may be passed directly to the bottom of column 2 where it enters the pool of liquid and mixes with liquid 15 or may be passed directly into the upper portion of main heat exchanger 4.

Figure 2:
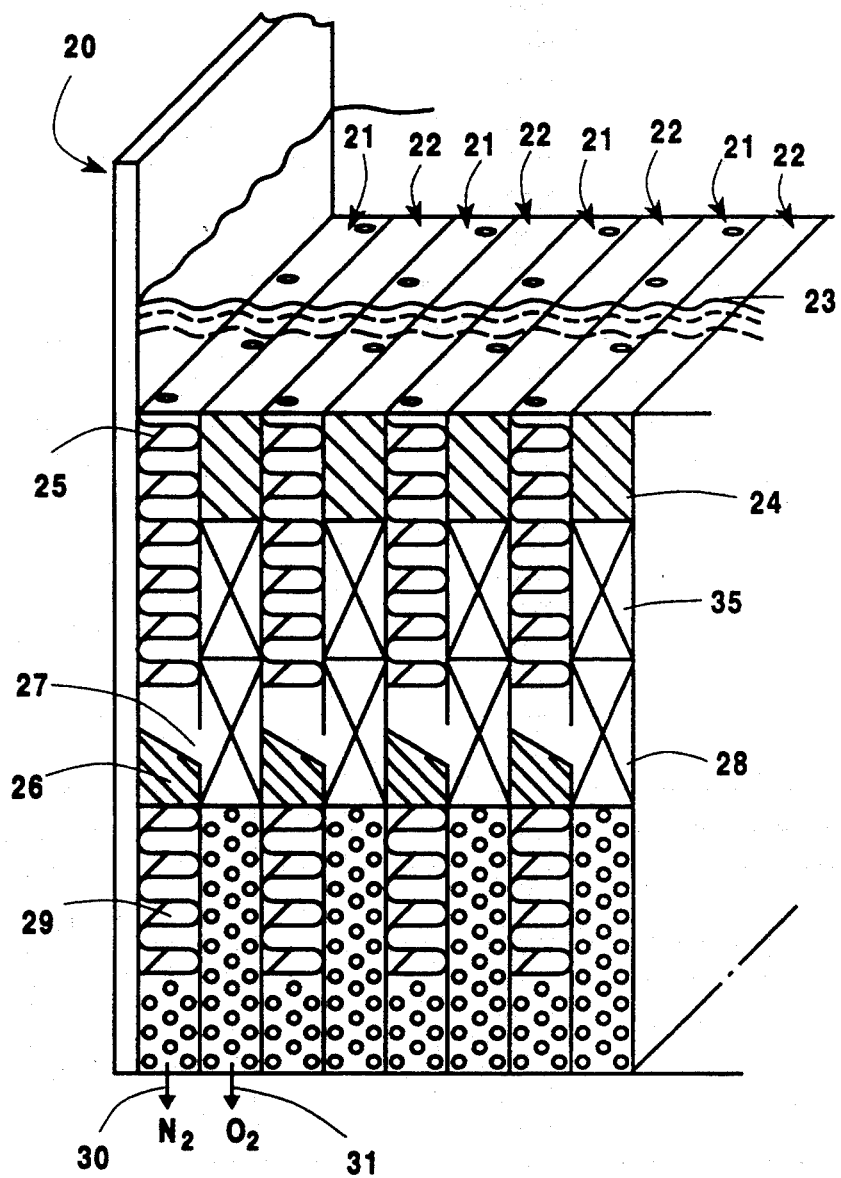
FIG. 2 is a detailed cross-sectional representation in perspective of one preferred embodiment of the downflow heat exchanger of this invention having a one stage distribution enhancement means.

FIG. 2 illustrates a preferred embodiment of a downflow heat exchanger which may be used as main heat exchanger 4. Heat exchanger 20 comprises a heat exchanger body comprised of a series of parallel vertically oriented plates spaced to form a series of first passages 21 and second passages 22 in alternating sequence. Liquid, e.g. liquid oxygen, 23 is passed into first passages 21. The liquid from the upper portion of heat exchanger 20 cannot pass into second passages 22 because of sealing bar 24. Support fins 35 support the partition sheet from buckling.

Within first passages 21 the liquid passes through a section comprising distribution enhancement means for achieving a well distributed flow of liquid. FIG. 2 illustrates a particularly preferred liquid distribution enhancement means. In the embodiment illustrated in FIG. 2, the liquid is evenly distributed in a single stage distribution by passing through a section comprising a one stage distribution enhancement means of perforated hardway fins 25 whose perforation area continuously increases from the top to the bottom of the vertically oriented hardway fin section. For example, the perforated area of the hardway fins at the top of the hardway firming may be less than 5 percent of the total hardway fin area at the top of the hardway finning, and may increase continuously to exceed 20 percent, preferably to exceed 25 percent, of the total hardway fin area at the bottom of the hardway finning.

Figure 6:
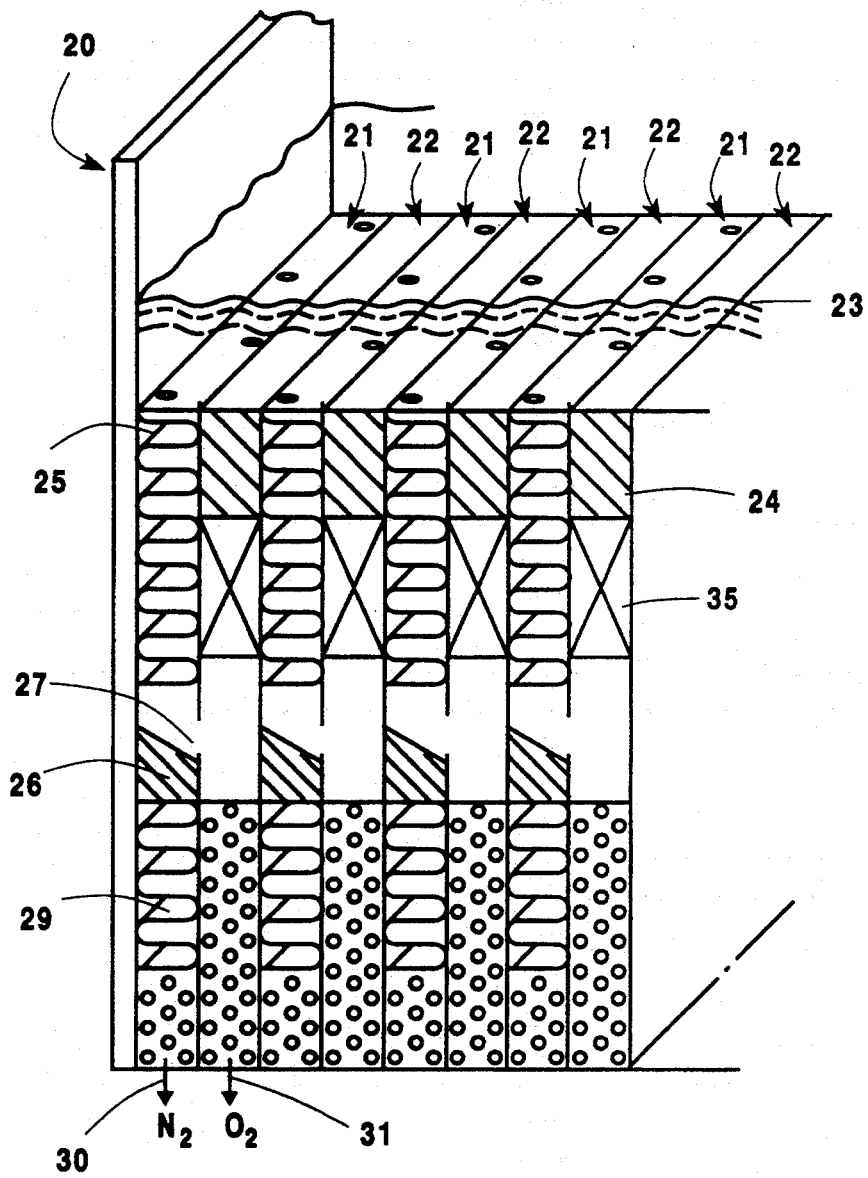
FIG. 6 is detailed cross-sectional representation of an embodiment of the heat exchanger of this invention similar to that illustrated in FIG. 2 but without the use of bridge fins where liquid flows from the first passages into the second passages.

The one stage perforated hardway finning serves to produce a well distributed liquid flow by ensuring that the liquid at the top of the heat exchanger flows evenly through all of the first passages. The single stage distribution is advantageous over conventional multi-stage distribution because of the elimination of transition zones or areas between stages where liquid maldistribution tends to occur. Upon passage through the hardway finning, the well distributed liquid passes onto sloped sealing bar 26 whose slope is at an angle within the range of from 30 to 60 degrees from horizontal. The liquid flows down along sealing bar 26 at this angle through slot 27 from the first passages 21 into the second passages 22 at a section containing bridge fins 28. The bridge fins are preferably plain fin corrugations made of a thicker gauge material and are longitudinally oriented at right angles to the hardway fins. The bridge fins serve a two-fold purpose: (1) to provide mechanical support for the partition sheets in the slotted region and (2) to subchannelize and maintain the fine liquid distribution obtained in first passages 21 while the liquid is transferred to second passages 22. While the use of such bridge fins is preferred, such fins need not always be present and one such arrangement is illustrated in FIG. 6.

Vapor, e.g. gaseous nitrogen, is passed into first passages 21 at 29 below sloped sealing bar 26 and slot 27 where the well distributed liquid is passed from the first passages into the second passages. The vapor and liquid then proceed cocurrently down through the first and second passages respectively and, in doing so, the vapor is condensed in passages 21 and the liquid is vaporized in passages 22 by indirect heat exchange. This section of the heat exchanger wherein the fluids flow cocurrently is the heat exchange section and the passages within this heat exchange section preferably have longitudinally oriented fins running the length of the passages to assist in the heat transfer. The resulting liquid and vapor exit the first and second passages respectively as shown by arrows 30 and 31 which, for illustrative purposes, are shown only for one set of passages and are labeled nitrogen and oxygen. The vaporization passages are closed at the top by sealing bar 24 so that all of the vaporized oxygen passes out of the bottom of the heat exchanger.

Figure 3:
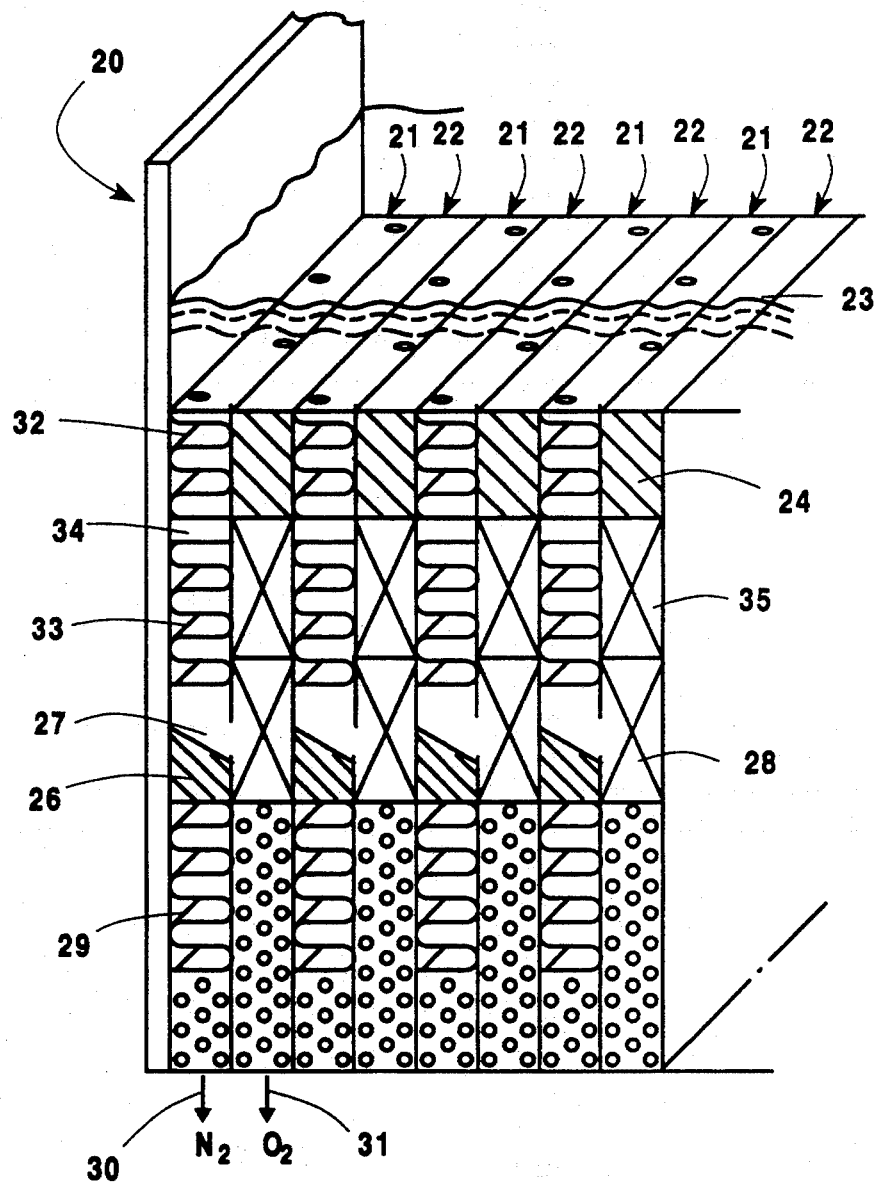
FIG. 3 is a detailed cross-sectional representation in perspective of another embodiment of the downflow heat exchanger of this invention having a two stage distribution enhancement means.

FIG. 3 illustrates another embodiment of the downflow heat exchanger of this invention wherein instead of a single stage distribution of the liquid prior to its being passed into the second passages and through the heat exchange section, there is employed a two stage distribution defined by a gap between the first stage and the second stage. The numerals in FIG. 3 correspond to those of FIG. 2 for the common elements and these common elements and their operation will not be described again.

The embodiment illustrated in FIG. 3 employs two sections of hardway fins. In this embodiment the liquid undergoes a two stage distribution, an initial rough distribution in the upper section and a second fine distribution in the lower section. The upper section 32 employs perforated hardway fins having a small perforated area, generally within the range of from 2 to 15 percent of the total hardway fin area in this section, while the lower section 33 employs perforated hardway fins having a larger perforated area, generally within the range of from 20 to 30 percent of the total hardway fin area in this section. The two hardway fin sections are segregated by a gap 34. The two stage distribution illustrated in FIG. 3 is not as preferred as the single stage distribution illustrated in FIG. 2, but this two stage embodiment may be easier or less expensive to fabricate.

Other means, in place of or in addition to perforated hardway fins, may be used in the practice of this invention as the distribution enhancement means for achieving the well distributed flow of liquid. Among such means one can name serrated or lanced hardway fins or packing materials.

Figures 4A, 4B:
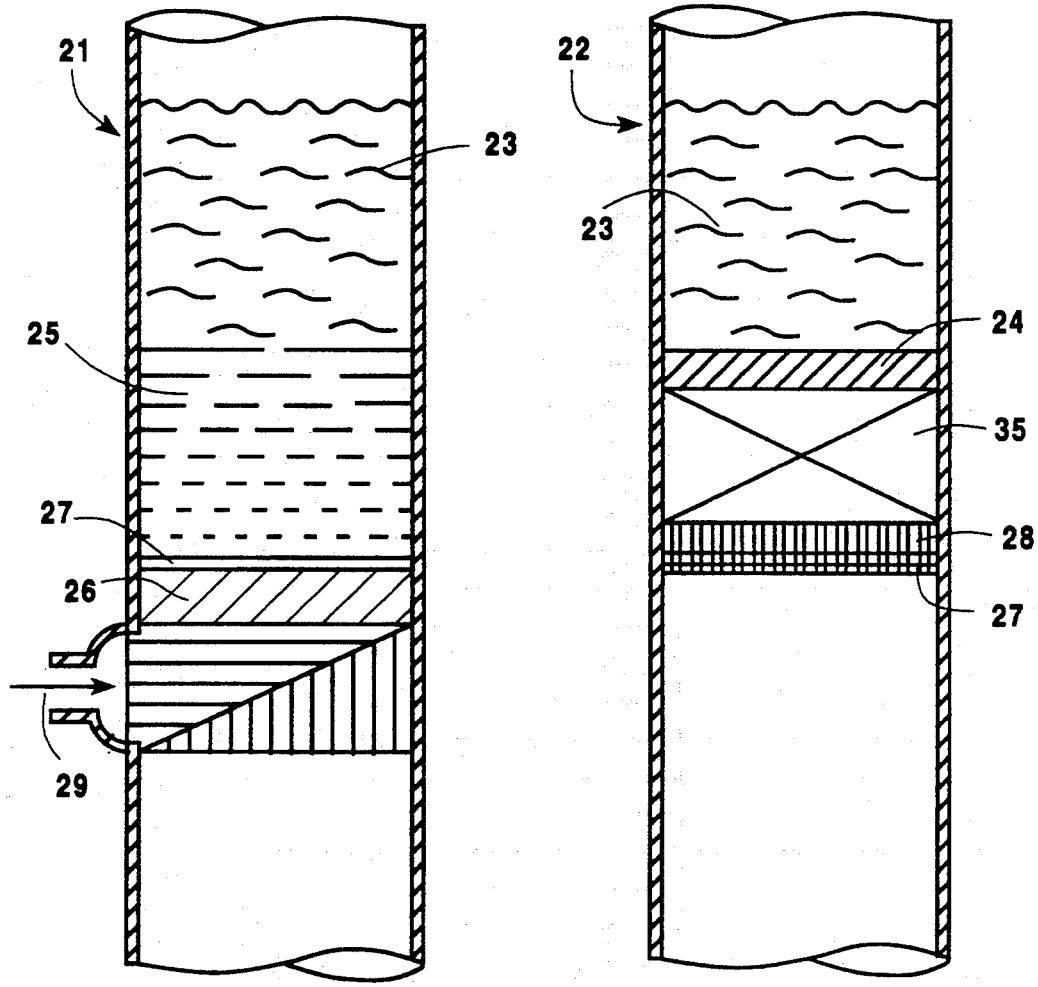
FIGS. 4A and 4B are cross-sectional stylistic representations of details of the liquid and vapor passages of the downflow heat exchanger embodiment illustrated in FIG. 2.

FIGS. 4A and 4B illustrate in representative fashion cross sectional views of a first passage and a second passage of the heat exchanger embodiment illustrated in FIG. 2 but from a different angle. The numerals in FIGS. 4A and 4B correspond to those of FIG. 2.

Figure 5A:
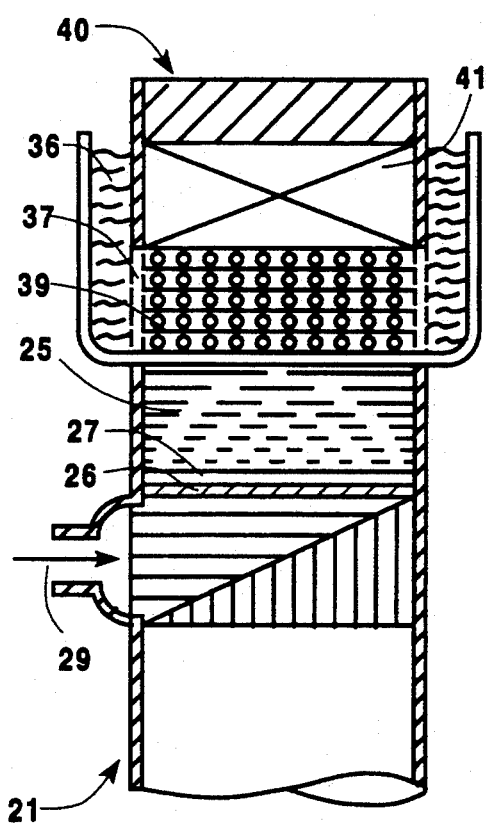
FIGS. 5A and 5B are cross-sectional stylistic representations of details of the liquid and vapor passages of another embodiment of the downflow heat exchanger of this invention wherein the liquid vaporizing passages may be open at the top.
Figure 5B:
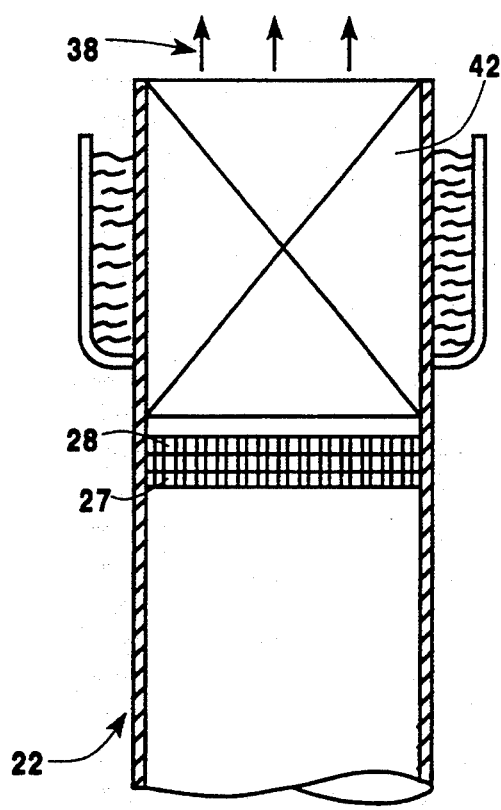

FIGS. 5A and 5B are illustrations, using the same schema as that of FIGS. 4A and 4B, of another arrangement which may be used in the practice of this invention wherein the liquid is provided to the first passages from the side rather than from the top. The numerals of FIGS. 5A and 5B correspond to those of FIG. 2 for the common elements. The fins in the heat exchange section are not shown in FIGS. 4A, 4B, 5A, and 5B. In this embodiment, liquid reservoir 36 is around the first and second passages, not above them, and the liquid is provided into the first passages through liquid inlet 37. Distribution fins 39, which can be perforated fins placed hardway to the main flow direction, are used to convey the liquid from the liquid inlet 37 to the top of the hardway fins 25. With this arrangement the vaporization passages 22 may be open at the top enabling part of the vapor generated by the heat exchange, e.g. gaseous oxygen, to be passed into the second column out through the top of the downflow heat exchanger, as indicated by arrows 38, rather than having all of the vapor pass out from the bottom of the heat exchanger. A sealing bar 40 is used to seal the top of passages 21 and support fins 41 are used between the distribution fins 39 and the sealing bar 40 in passages 21. Additional support fins 42 are used above the bridge fins 28 in passages 22.

Figure 7:
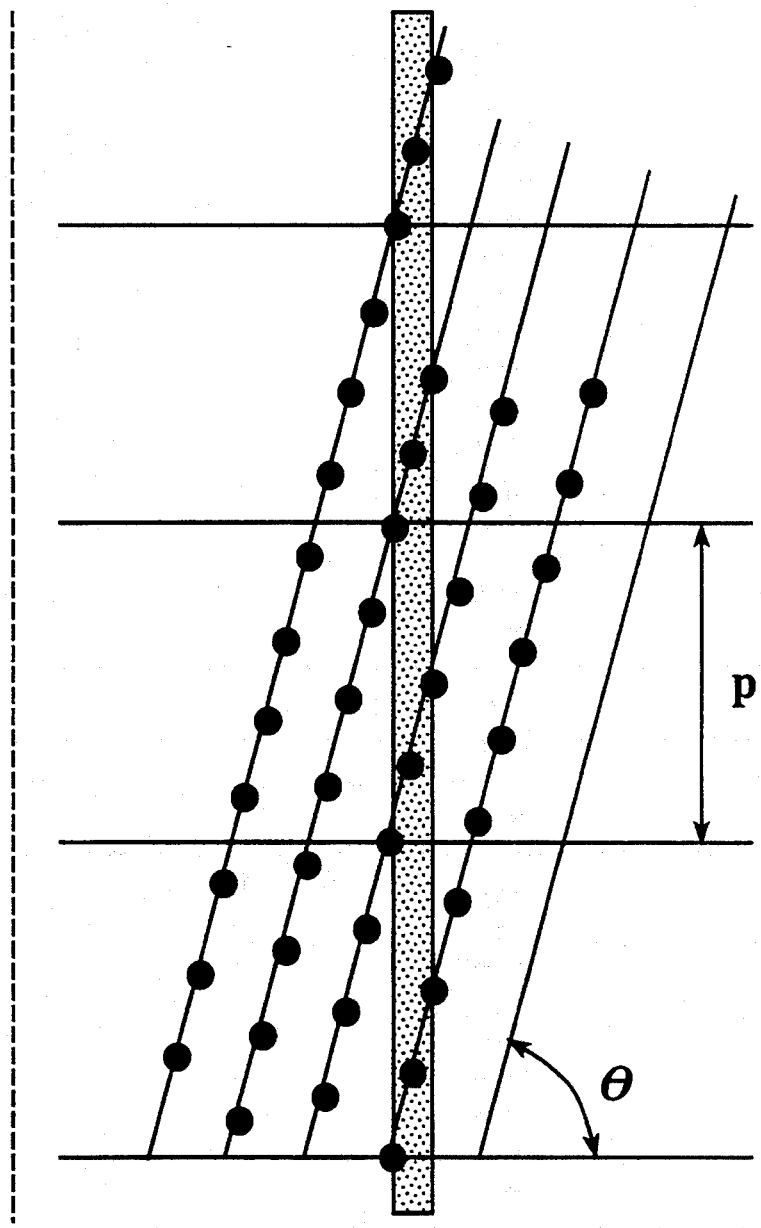
FIG. 7 illustrates one preferred perforation pattern for hardway fins which may be used in the practice of this invention.

FIG. 7 illustrates a preferred perforation pattern for hardway fins useful in the practice of this invention. A triangular layout of the perforations is illustrated. This is a preferred layout although other layouts, such as a square layout, may be used. In FIG. 7 the solid lines, which are at an angle $\theta$ to the horizontal, are lines along which the perforations are aligned. To create fins, the material is folded along lines which are parallel to the broken line. The shaded region denotes an area of the fin material which spans a passage 21 when the fins are contained in a passage 21.

To ensure uniform flow of liquid through the fins, it is preferred that the hole pattern repeat at short regular intervals along the length of the fin. On FIG. 7, this distance is shown as p. There are discrete values of $\theta$ which ensure a regular repeated hole pattern and these are $\theta = 30°$, $60°$, $70.9°$, $76.1°$, $79.1°$, $81.1°$, $82.4°$, $83.4°$, etc. where $\theta = \tan^{-1}((2n+1)/\sqrt{3})$ and n takes an integer value. The spacing p increases as $\theta$ increases.

A further consideration is to ensure that all the fin surfaces contain at least some perforations which otherwise could prevent liquid flow through the passage. On FIG. 7, the shaded area must contain at least some perforations. As $\theta$ is reduced, the probability increases that one or more fin surfaces could be unperforated. We have found that the optimum values of $\theta$ are $70.9°$, $76.1°$ or $79.1°$ with a value of $76.1°$ being generally preferred. This ensures that all fin surfaces are perforated together with a satisfactory value of p.

The change in the perforation area of the hardway fins may be achieved by reducing the pitch between the holes. A reduction in pitch results in closer hole spacing, increasing the perforation area. For a 5 percent open fin material the pitch is 10.6 mm and for the 25 percent open area the pitch is 4.76 mm for 2.5 mm diameter holes on a triangular pitch.

Now by the use of this invention one may employ a downflow liquid heat exchanger having improved liquid distribution prior to the heat exchange than is achievable with heretofore available downflow heat exchangers. Although the invention has been described in detail with reference to certain preferred embodiments, those skilled in the art will recognize that there are other embodiments of the invention within the spirit and scope of the claims.

We claim:

1. A method for vaporizing a liquid by indirect heat exchange with a vapor comprising:
   (A) providing a heat exchanger having at least one first passage and at least one second passage in alternating sequence;
   (B) passing liquid into said first passage(s) and down through said first passage(s) through a section comprising means for achieving a well distributed flow of liquid which is a two stage distribution enhancement means comprising an upper section of perforated hardway fins and a lower section of perforated hardway fins with a gap between the upper and lower sections wherein the perforation area of the hardway fins in the upper section is within the range of from 2 to 15 percent of the hardway fin area in said upper section and the perforation area of the hardway fins in the lower section is within the range of from 20 to 30 percent of the hardway fin area in said lower section;

(C) passing said well distributed liquid from said first passage(s) into said second passage(s) at an angle within the range of from 30 to 60 degrees from horizontal onto bridge fins located within said second passage(s);

(D) passing vapor into said first passage(s) below the point where said well distributed liquid is passed from said first passage(s); and (E) passing vapor and liquid cocurrently through said first and second passages respectively and vaporizing said liquid in said second passage(s) by indirect heat exchange with said vapor in said first passage(s) during said cocurrent flow.

2. The method of claim 1 wherein said liquid is liquid oxygen.

3. The method of claim 1 wherein said vapor is gaseous nitrogen.

4. The method of claim 1 wherein none of the vaporized liquid passes out of the heat exchanger from the top of the heat exchanger.

5. The method of claim 1 wherein a portion of the vaporized liquid passes out from the heat exchanger from the top of the heat exchanger.

6. A heat exchanger comprising:

(A) a heat exchanger body having at least one first passage and at least one second passage in alternating sequence, said first passage(s) having a section comprising distribution enhancement means for achieving a well distributed flow of liquid which is a two stage distribution enhancement means comprising an upper section of perforated hardway fins and a lower section of perforated hardway fins with a gap between the upper and lower sections wherein the perforation area of the hardway fins in the upper section is within the range of from 2 to 15 percent of the hardway fin area in said upper section and the perforation area of the hardway fins in the lower section is within the range of from 20 to 30 percent of the hardway fin area in said lower section;

(B) means for passing liquid into said first passage(s) above said distribution enhancement means;

(C) liquid passing means below said distribution enhancement means for passing liquid from said first passage(s) into said second passage(s) at an angle within the range of from 30 to 60 degrees from horizontal onto bridge fins located within said second passage(s); and (D) means for passing vapor into said first passage(s) below said liquid passing means.

7. The heat exchanger of claim 6 wherein the second passage(s) are sealed in the upper portion thereby keeping vapor from passing out from the top of the heat exchanger from the second passage(s).

8. The heat exchanger of claim 6 wherein the second passage(s) are unsealed in the upper portion thereby enabling vapor to pass out from the top of the heat exchanger from the second passage(s).

9. A double column system comprising a first column, a second column and a main heat exchanger, said double column system comprising:

(A) a heat exchanger body of the main heat exchanger having at least one first passage and at least one second passage in alternating sequence, said first passage(s) having a section comprising distribution enhancement means for achieving a well distributed flow of liquid which is a two stage distribution enhancement means comprising an upper section of perforated hardway fins and a lower section of perforated hardway fins with a gap between the upper and lower sections wherein the perforation area of the hardway fins in the upper section is within the range of from 2 to 15 percent of the hardway fin area in said upper section and the perforation area of the hardway fins in the lower section is within the range of from 20 to 30 percent of the hardway fin area in said lower section;

(B) means for passing liquid from said second column into said first passage(s) above said distribution enhancement means;

(C) liquid passing means below said distribution enhancement means for passing liquid from said first passage(s) into said second passage(s) at an angle within the range of from 30 to 60 degrees from horizontal onto bridge fins located within said second passage(s); and (D) means for passing vapor from said first column into said first passage(s) below said liquid passing means.

10. The system of claim 9 wherein the second passage(s) are sealed in the upper portion of the heat exchanger body thereby keeping vapor from passing out from the top of the heat exchanger into the second column from the second passage(s).

11. The system of claim 9 wherein the second passage(s) are unsealed in the upper portion of the heat exchanger body thereby enabling vapor to pass out from the top of the heat exchanger into the second column from the second passage(s).

* * * * *

UNITED STATES PATENT AND TRADEMARK OFFICE
CERTIFICATE OF CORRECTION

PATENT NO. : 5,438,836
DATED : August 8, 1995
INVENTOR(S) : V. Srinivasan etal

It is certified that error appears in the above-identified patent and that said Letters Patent is hereby corrected as shown below:

In column 5, line 28 delete "an" and insert therefor --at--.

In column 6, line 34 delete "firming" and insert therefor --finning--.

Signed and Sealed this

Seventeenth Day of October, 1995

Attest:

BRUCE LEHMAN

Attesting Officer    Commissioner of Patents and Trademarks